Patented Oct. 20, 1936

2,058,013

UNITED STATES PATENT OFFICE 2,058,013

MANUFACTURE OF AMIDES OF HIGHER FATTY ACIDS

Clyde O. Henke and Walter H. Zartman, Wilmington, Del., assignors to E. I. du Pont de Nemours & Company, Wilmington, Del., a corporation of Delaware No Drawing. Application May 31, 1935, Serial No. 24,362

9 Claims. (Cl. 260—124)

This invention relates to the N-substituted acid amides and more particularly to the N-dialkyl acid amides of the higher fatty acids and their manufacture.

The preparation of amides of the fatty acids has been the subject matter of various patents and technical articles of which U. S. Patents 1,932,180; 1,954,433; 1,986,854; 1,990,453; British Patents 337,368; 384,665; 406,691; and J. A. C. S., 53, 1879–1883 (1931) may be taken as representative. All of the processes set forth in this literature carefully exclude water from the reaction mixture as much as possible. Usually, a fatty acid amide is prepared by reacting a fatty acid with an amine under conditions favoring the rapid elimination of water from the reaction mixture. It has also been proposed to use glycerides of these fatty acids instead of the more expensive fatty acids for the preparation of these amides. However, none of the literature mentioned above proposes to prepare amides by reacting an aqueous solution of an aliphatic amine with an aliphatic ester of an aliphatic monocarboxylic acid.

This invention has as an object an economical and advantageous process for the manufacture of N-substituted amides of the higher fatty acids. A further object is to provide a process for making N-alkyl amides of aliphatic monocarboxylic acids containing chains of eight or more carbon atoms which obviates the expenses and difficulties which attend prior art processes involving the use of anhydrous amines and dehydrating catalysts. A still further object is to manufacture products having a variety of valuable technical uses. Other objects will appear hereinafter.

These objects are accomplished by the following invention according to which N-aliphatic amides of aliphatic monocarboxylic acids containing chains of eight or more carbon atoms are prepared by reacting aliphatic esters of said acids with an aqueous solution of a primary or secondary aliphatic amine at elevated temperatures.

The following example illustrates but does not limit the invention.

Example 174 parts by weight of beef tallow and 324 parts of an aqueous 25% solution of dimethyl amine were heated in an autoclave at 200° C. for 16 hours. The excess dimethyl amine solution was distilled off at 200° C. and absorbed in water and may be reused. The resulting impure amide was vacuum distilled. The first fraction, boiling range 155–190° C. at 5 mm., consisted essentially of glycerine. The bulk of the product then distilled at 190–230° C. at 5 mm. and consisted of the dimethyl amides of the acids contained in beef tallow (which are present in the form of esters).

In place of an aqueous dimethyl amine solution, any aliphatic amine that is soluble in water such as diethyl amine, dibutyl amine, di-iso-amyl amine, dipropyl amine, di-ethanol amine, methyl amine, butyl amine, amyl amine, ethanol amine, ethyl amine, propyl amine, cyclohexyl amine, piperidine and others may be used.

The concentrations of the above amines in an aqueous solution is not limited but may cover the whole range from a very dilute solution up to an almost anhydrous condition.

In place of beef tallow, there may be used the glycerides of higher saturated and unsaturated fatty acids or hydroxy fatty acids and the like or mixtures thereof, for example, olive oil, castor oil, linseed oil, rape seed oil, arachis oil, cotton seed oil, poppy seed oil, palm kernel oil, soya bean oil, coconut oil, and others.

This invention is not limited to the glycerine esters but may be applied to the monohydric alcohol esters, the dihydric alcohol esters, etc., such as the ethyl esters, the propyl esters and their homologues and to the ethylene glycol esters, the propylene glycol esters and their homologues.

The temperature of the reaction need not be restricted to 200° C. but may cover a broad range from 100° C. to 300° C. and up. The time of heating need not be restricted to 16 hours, but may vary with the particular reaction being made. The ratio of amine to ester may vary from an equivalent amount to several times the equivalent amount as the excess is recovered.

Various advantages attend this invention which make it a marked advance over prior art methods. The use of an anhydrous amine or a catalyst is unnecessary. The excess amine may be distilled and recovered by absorption in water or otherwise. Dehydration of the recovered amine is not necessary. High temperatures and pressures together with the use of a large excess of amine reduces considerably the time required for aminolysis to take place, thereby forming the amide rather than saponifying the glyceride and the subsequent formation of the ammonium substituted salt.

The products thus obtained find a variety of uses for example, in the textile, leather, soap, paper, and perfume industries, as intermediates for use in the production of pharmaceutical, cosmetic, detergent, wetting, dispersing and emulsifying agents, and as stomach insecticides. The above mentioned compounds may be also used as intermediate products in various organic syntheses.

As many apparently widely different embodiments of this invention may be made without widely departing from the spirit and scope thereof, it is to be understood that the invention is not limited to the specific embodiments thereof except as defined in the appended claims.

We claim:

1. A process of making N-aliphatic amides of aliphatic monocarboxylic acids containing chains of eight or more carbon atoms which comprises reacting aliphatic esters of said acids with an aqueous solution of an aliphatic amine in a closed reaction vessel at a temperature above 100° C.

2. A process according to claim 1 in which an aqueous solution of dimethyl amine is employed.

3. A process according to claim 1 in which an aqueous solution of diethanol amine is employed.

4. A process of making N-aliphatic amides of aliphatic monocarboxylic acids containing chains of eight or more carbon atoms which comprises reacting glycerides of said acids with an aqueous solution of an aliphatic amine containing at least one replaceable hydrogen atom attached to the nitrogen atom in a closed reaction vessel at a temperature above 100° C.

5. A process according to claim 4 in which an aqueous solution of dimethyl amine is employed.

6. A process according to claim 4 in which an aqueous solution of diethanol amine is employed.

7. A process of making N-alkyl amides of aliphatic monocarboxylic acids containing chains of eight or more carbon atoms which comprises reacting a substance of the group consisting of fats and oils consisting essentially of glycerides of said acids with an aqueous solution of an alkyl amine containing a replaceable hydrogen atom attached to the nitrogen atom in a closed reaction vessel at a temperature between 100° C. and 300° C.

8. A process of making N-dimethyl amides of aliphatic monocarboxylic acids containing chains of eight or more carbon atoms which comprises reacting a substance of the group consisting of fats and oils consisting essentially of glycerides of said acids with an aqueous solution of dimethyl amine in a closed reaction vessel at a temperature between 100° C. and 300° C.

9. A process of making the dimethyl amides of the acids contained in beef tallow which comprises heating 174 parts of beef tallow with 324 parts of a 25% aqueous solution of dimethyl amine in an autoclave at 200° C. for 16 hours, and fractionating the product thereby obtained.

CLYDE O. HENKE.
WALTER H. ZARTMAN.

CERTIFICATE OF CORRECTION.

Patent No. 2,058,013.  October 20, 1936.

CLYDE O. HENKE, ET AL.

It is hereby certified that error appears in the printed specification of the above numbered patent requiring correction as follows: Page 2, first column, line 16, claim 1, after the word "amine" insert "containing at least one replaceable hydrogen atom attached to the nitrogen atom"; and that the said Letters Patent should be read with this correction therein that the same may conform to the record of the case in the Patent Office.

Signed and sealed this 9th day of March, A. D. 1937.

Henry Van Arsdale
Acting Commissioner of Patents.

(Seal)